April 8, 1958 J. POLARD 2,829,428
INSERTING HEAD FOR STATOR COIL INSERTING MACHINES
Filed July 10, 1953 5 Sheets-Sheet 1

April 8, 1958 J. POLARD 2,829,428
INSERTING HEAD FOR STATOR COIL INSERTING MACHINES
Filed July 10, 1953 5 Sheets-Sheet 3

April 8, 1958  J. POLARD  2,829,428
INSERTING HEAD FOR STATOR COIL INSERTING MACHINES
Filed July 10, 1953  5 Sheets-Sheet 4
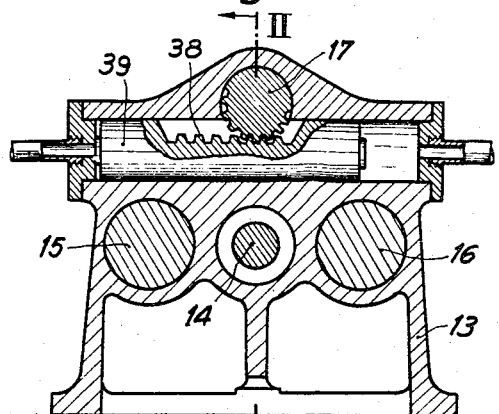
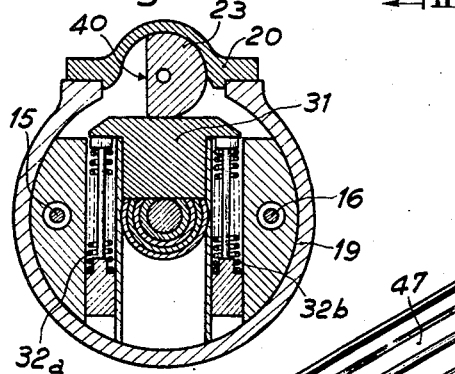
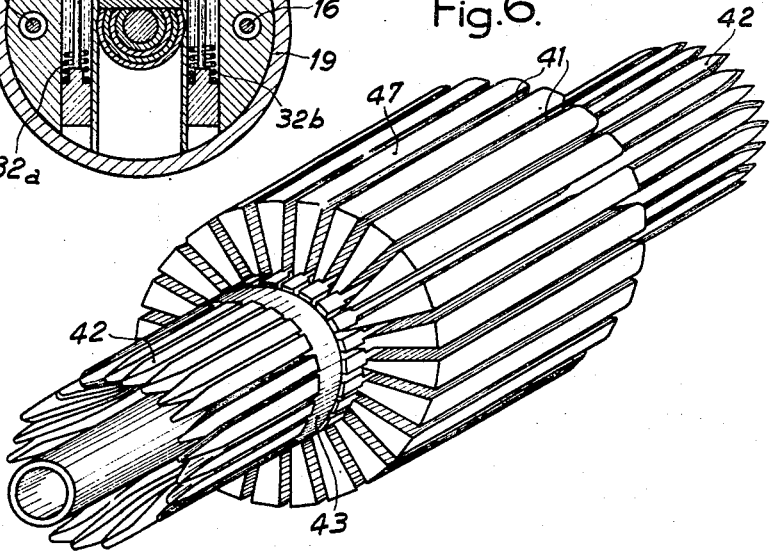

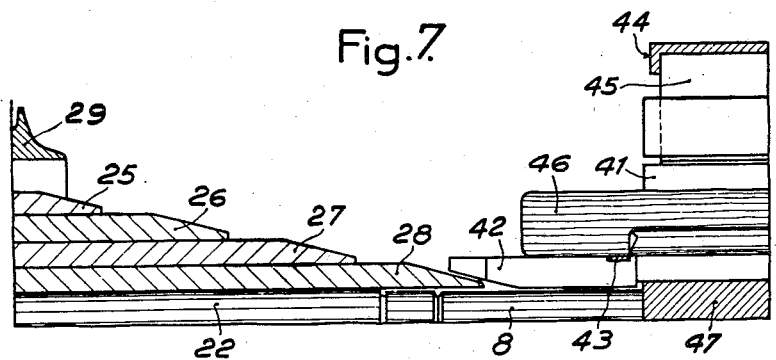
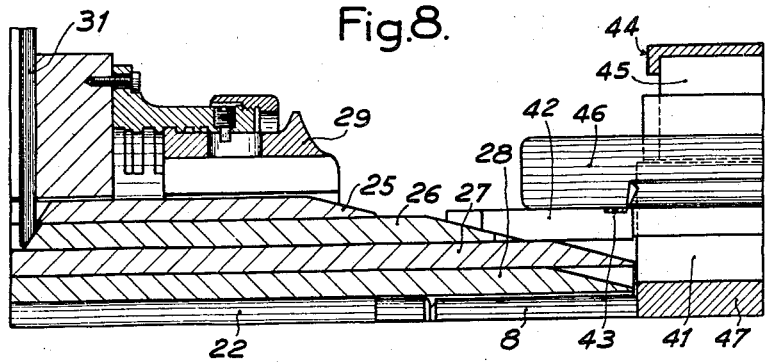
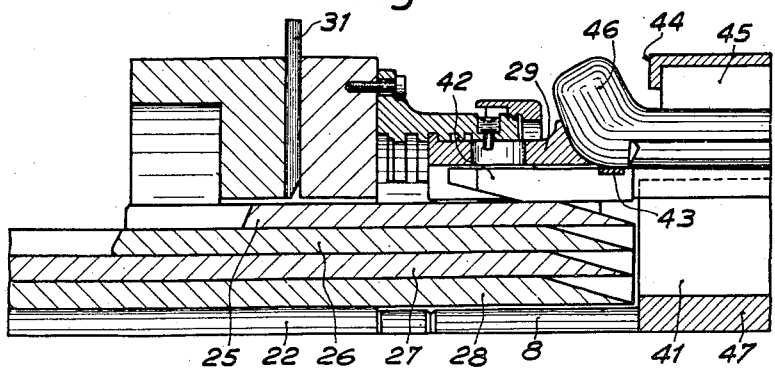

United States Patent Office 2,829,428
Patented Apr. 8, 1958

2,829,428

INSERTING HEAD FOR STATOR COIL INSERTING MACHINES

Jean Polard, Saint-Germain-en-Laye, France, assignor to Societe Anonyme dite: Compagnie Electro-Mecanique, Paris, France Application July 10, 1953, Serial No. 367,276

Claims priority, application France November 7, 1952

4 Claims. (Cl. 29—205)

The automatic winding of stator coils of electrical machines, particularly of induction motors, for example of the character described in the U. S. Patent No. 2,506,173, filed on November 4, 1948, may be effected by means of mechanically- or hydraulically-controlled machines. In order to keep the operation of the coil inserting machine abreast with production rate requirements, the various steps involved must be fully or partially automatic. Thus, these more or less fully automatic production conditions have led to the development of progressively more compact units comprising the transfer members and coil formers (such as telescopic cones and combs), called "winding heads" which, in comparison with the arrangement disclosed in the afore-mentioned patent offer several new features in the art.

It is the essential object of this invention to provide an inserting head of the type broadly described hereabove, the essential feature of this novel inserting head consisting in that by using this inserting head on a single coil inserting machine it is possible to insert coils in stators of different diameters and lengths, within large limits.

An inserting head according to this invention comprises the following components:

A body consisting of one or more parts for supporting and assembling the various members of the head. With this body the inserting head may become either a fully self contained unit or on the contrary a more or less integral part of the very frame structure of the coil inserting machine;

A central shaft for longitudinally positioning the false or dummy rotors;

Telescopic tubular members formed with frusto-conical end portions, with their corresponding locking means and common return stud, mounted on the aforesaid central shaft through the medium of a suitably shaped member;

A camshaft the new design of which constitutes one of the essential features of the invention;

A mechanical, rigid connection between the central shaft and the camshaft, which also constitutes one of the essential features of this invention;

Control members or control-operated intermediate members, according as a mechanical or hydraulic control is contemplated.

In the above-mentioned patent the position of the stepped cams of the camshaft was stationary in the space. The action exerted by the telescopic tubular members on the dummy rotor driver-rods depended on the displacement, along the stepped cams, of the tubular member locking device, so that any alteration in the relative position of the dummy rotor with respect to the cams resulted in a change in the kind of action exerted by the tubular members and therefore in the centripetal displacement of the driver-rods. Now any variation in the length of the dummy rotor would involve automatically this change in the relative position.

This inconvenience is avoided by forming on one face of the camshaft a series of steps to be substituted for the former stepped cams, and by mechanically connecting this shaft to the central shaft. Thus, any longitudinal displacement of the central shaft will produce an equivalent displacement of the camshaft.

The invention will now be described with reference to the attached drawings, wherein:

Figure 4 is another section taken on the line IV—IV of Fig. 2.

Figure 5 is a further section taken on the line V—V of Figs. 2 and 3.

Figure 6 shows a dummy rotor and the push members as positioned before the coils are inserted into the slots.

Figures 7 to 9 are fragmentary views showing in section the end portion of the dummy rotor and the end portion of a coil-inserting head at the beginning, in the middle, and up completion of a coil-inserting operation.

Figure 1A:
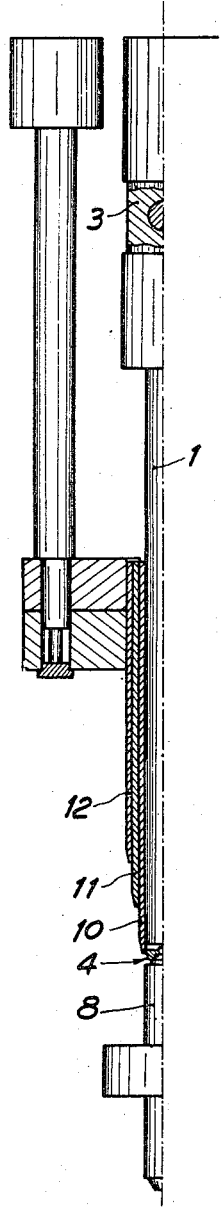
Figures 1 and 1a are diagrammatic, part-sectional, part-elevational views showing an inserting head of a stator coil inserting machine, Fig. 1a having a section portion taken on the line 1a—1a of Fig. 1.
Figure 1:
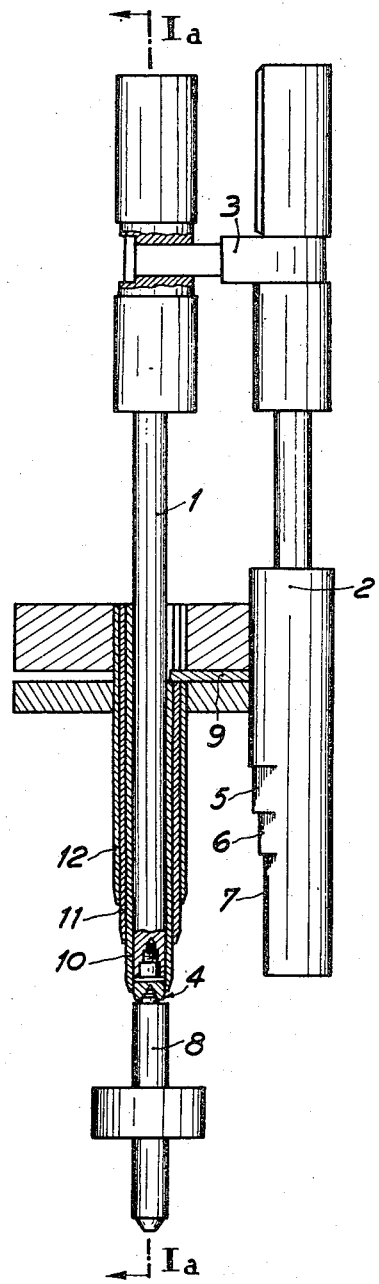

The central shaft 1 is connected through a mechanical linking member 3 to the camshaft 2. Thus, the bearing face 4 of the central shaft which engages the dummy rotor spindle 8 has constantly the same relative position with respect to the steps 5, 6, 7 formed on one face of the camshaft. For inserting coils in stators of same diameter but different lengths, the dummy rotors are provided with a constant-length spindle 8, as already set forth hereinabove, and as a result the release of the locking device 9, as it engages the different steps of the camshaft, will take place for constantly unvarying movements or strokes of the tubular members 10, 11 and 12, which correspond to constantly identical radial movements of the driver-rods. During this operation the bearing face 4 of the central shaft 1 may be in any spatial position depending only on the total length of the dummy rotor and therefore on the length of the notched portion thereof, and finally on the core length of the stator to be wound, as the spindles have a constant length.

Regarding the possibility of inserting coils in stators having bores of different diameters, this will depend only on the total thickness, at the end of their travels, of the various tubular members in sliding engagement with one another, the inner diameter of the notches in the dummy rotor remaining substantially the same in all conditions. This total thickness may be altered by changing the tube thickness and/or number. Therefore, the transfer of coils in stators of different bore diameters is effected according to the invention by modifying the number and/or thickness of these tubular members. Since the number of steps on the camshaft corresponds to the number of tubular members used, in carrying out the invention the whole or part of the number of steps available will be used according to the bore diameter of the stator to be wound, the proper method depending on the adequate selection of the lengths of the corresponding dummy rotor spindles.

From the foregoing it will be seen that with an inserting head made in accordance with the principles of this invention it is possible:

(a) To directly insert coils in stators of same diameter and different lengths, provided the corresponding dummy rotors are fitted with spindles of unvarying length;

(b) To insert coils in stators of same length and different diameters, provided that the number and/or thickness of the telescopic tubular members are modified accordingly, and that adequate lengths are selected for the dummy rotor spindles.

Besides, the fact that all the inserting and forming members are combined into a unitary inserting head makes it possible to quickly match the desired number of tubular members with the adequate thickness.

Figure 2:
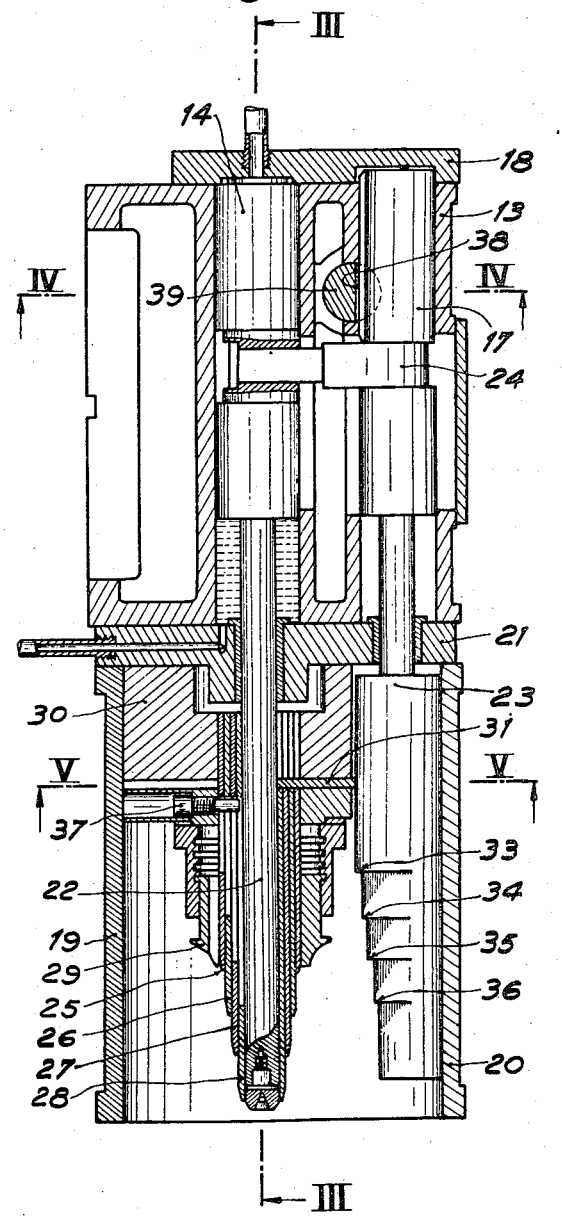
Figure 2 is a sectional view showing a hydraulically-actuated coil-inserting head, the section being taken on the line II—II of Fig. 4.
Figure 3:
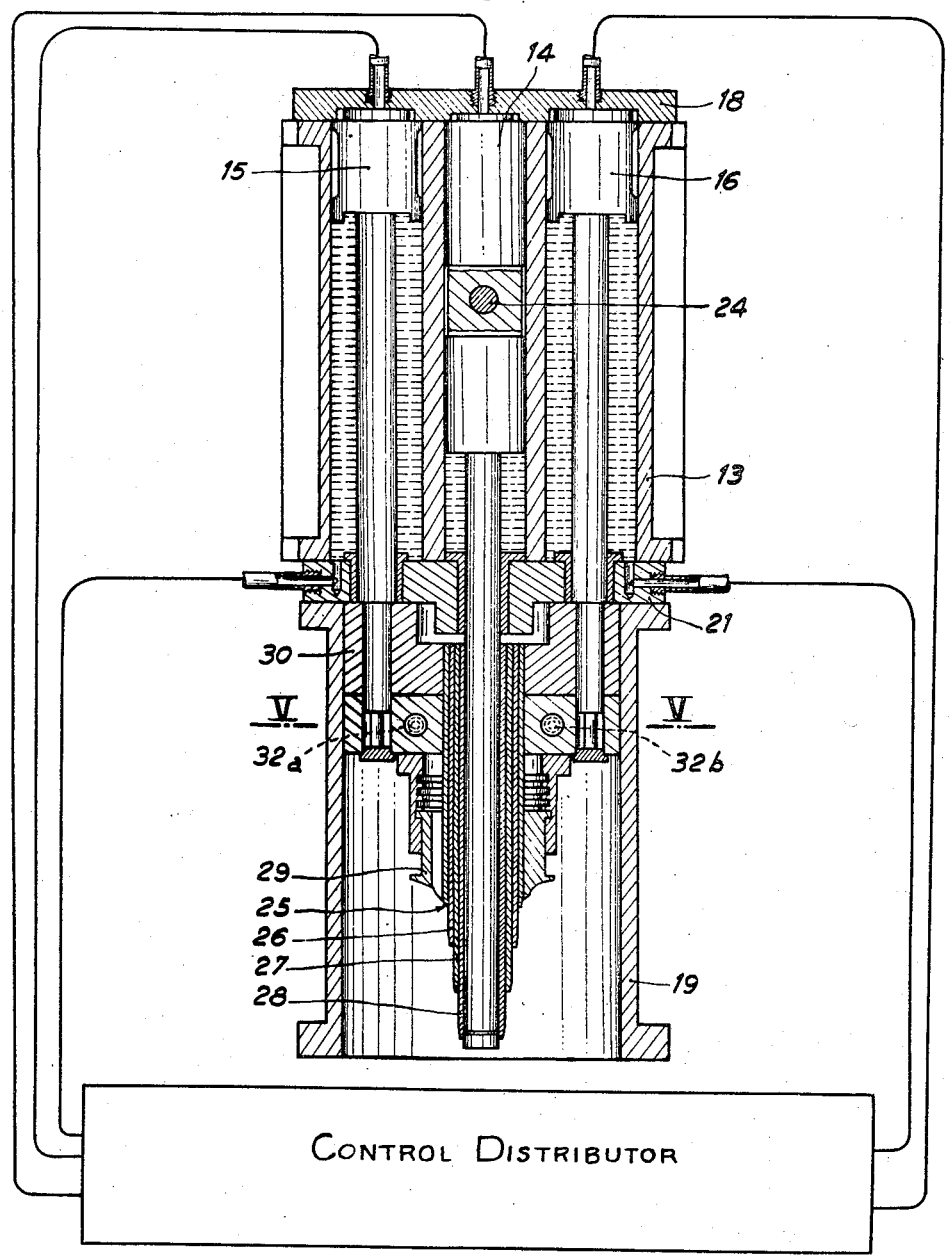
Figure 3 is a section taken on the line III—III of Fig. 2.

Reference will now be made to the Figs. 2 to 5 of the accompanying drawings which show a hydraulically controlled inserting head.

In this form of embodiment the body of the inserting head consists of three elements 13, 19 and 20 assembled through an intermediate member 21 and closed by a cap member 18. The central shaft 22 is an axial extension of a central piston 14 controlling the longitudinal travel of this shaft. The camshaft 23 has fitted therein a toothed segment 17 and is rigidly connected to the central shaft 22 through a link member 24 located in a cavity of the piston 14 and fastened to the camshaft 23. The toothed segment 17 enables the camshaft 23 to rotate about its axis under the impulse of the toothed rack 38 actuated in turn by a piston 39. The different steps formed on one face of the camshaft are shown at 33, 34, 35, 36 and Fig. 5 shows the face 40 of this shaft whereby the tubular members can be released after rotating this shaft through one fraction of a revolution, for instance a quarter turn.

The casting 13 forming one element of the body comprises a pair of bores receiving corresponding pistons 15 and 16 for actuating the guide member 30 supporting the telescopic tubular members 25, 26, 27, 28 (see Fig. 3); this guide member 30 also carries the comb member 29, the locking device 31, the lock springs 32a and 32b, and the return screw 37.

The above-described inserting head is driven by means of a hydraulic control distributor (Fig. 3) forming part of the control devices of the machine of which the inserting heads constitute but one element. This hydraulic distributor provides for the unlocking, duration, stopping and proper sequence of the various movements involved. Therefore, reference will only be made hereafter to the manner in which these movements take place in connection with the operation of a winding head of the kind described hereinabove.

Between the ends of the central shafts 22 of the inserting heads of a stator coil inserting machine there is positioned a dummy rotor 47 such as illustrated in Fig. 6, each slot 41 of this dummy rotor receiving a push member 42 held therein by spring rings 43. This dummy rotor is coaxial with the stator 44 in whose slots 45 the coils 46 disposed beforehand in the slots 41 of the dummy rotor are to be inserted through the medium of the radial movement imparted thereto by the push members 42, the slots 41 and 45 being arranged in coextensive relationship for this purpose.

When fluid pressure is applied to the piston 14 of the central shaft, this shaft moves axially and carries along the camshaft 23 and the toothed segment 17 which slides in the rack 38 while remaining in meshing engagement therewith. When this movement is completed, the central shaft engages with its outer end the bearing face of the corresponding dummy rotor spindle and is therefore properly positioned insofar as the action of the tubular members and the release of the locking device is concerned, the positions of the camshaft 23, rack 38 and control piston 39 of this rack having been adjusted beforehand.

The application of fluid pressure to the pistons 15 and 16 causes the guide member 30 to move in the same direction as the previously actuated central shaft. As the guide member moves the locking device 31, which holds the tubular members 25, 26, 27, 28 in interlocked relationship with one another, these tubular members travel in this direction as long as they are engaged by this device. When the locking device clears the first step 33 of the camshaft, the resilient action of the pair of springs 32a and 32b will cause it to release the first or innermost tubular member 28 having completed its travel. As the guide member 30 continues its forward travel the locking device is again actuated on clearing each of the successive steps 34, 35, 36 to release the following tubular members 27, 26 and 25. When this last tubular member has been released, any further movement of the guide member will have no influence on the tubular members and these will remain in position.

As the guide member 30 is further moved by the continuing fluid pressure on the pistons 15 and 16, the comb member 29, the action of which was commenced at an intermediate point to be adjusted beforehand, completes its travel to the extent required for the stator to be wound. When the whole transfer operation is completed the guide member 30 is stopped.

Figures 7 to 9 illustrate the successive steps of the transfer of the coils from the slots 41 of the dummy rotor to those 45 of the stator, and the formation of the coil head.

Then the fluid pressure will act on the rack-actuating piston 39 and the rack 38 in meshing engagement with the toothed segment 17 will cause the camshaft 23 integral or fast therewith to rotate through the required angle of circular sector. Thus, conditions are set up for returning the whole assembly to its initial position, the locking device frictionally engaging the smooth face 40 of the camshaft.

The reverse movements occur subsequently in the same manner through the action of fluid pressure on the opposite faces firstly of both pistons 15, 16, then of piston 14 and finally of piston 39, under the conditions of adjustment of the hydraulic control. During these movements the tubular members are all restored to their original positions by the return screw 37 engaging the inner ends of longitudinal slots formed in the walls of these tubular members.

The above description of the operative movements taking place during the actuation of the inserting head according to this invention shows that each movement can be adjusted independently of the other in order to secure any desired sequence thereof by means of an external control member. Similarly, the amplitude, velocity and synchronization of the movements occurring either in a single head or in a pair of jointly-operating heads may be controlled from external means. Thus, the use of inserting heads according to this invention in the design and mounting of coil inserting machines is characterized by a great flexibility and makes it possible to provide the operating conditions which are most suitable for the kind and rate of production contemplated.

What I claim is:

1. In a coil inserting machine for inserting winding coils into stators of electrical machinery, the stators having peripheral slots extending longitudinally and radially thereof to receive the coils, in combination, a prewound false rotor having a spindle and slots equal in number and substantially corresponding in width to the stator slots, the pre-wound rotor having coils in said slots, wedges associated with said coils for displacing the coils radially and arranged extending out of said slots at least at one end thereof, means for holding the prewound rotor co-axial with the stator and with the stator slots disposed radially of the rotor slots in correspondence therewith, at least one coil inserting head arranged adjacent one end of the stator for driving the wedges radially thereby to drive the coils arranged in the rotor slots radially into the stator slots, said head comprising a first shaft movable longitudinally from a first position into co-axial engagement with the end of the rotor spindle adjacent to which the wedges extend out of the rotor slots, a plurality of tubular members slidably nested in one another and co-axial with said first shaft thereby co-axial with said rotor, the tubular members being frusto-conical at their ends next to the rotor and adapted to drive said wedges and associated coils radially, a cam shaft radially spaced from said first shaft and fixed thereto so as to be movable axially therewith and having a plurality of steps defining cam surfaces thereon, means for selectively driving the first shaft from the first position into coaxial engagement with said rotor spindle end, actuating means guided on said first shaft and movable axially thereon selectively to move said tubular members axially toward said false rotor, said actuating means including means selectively engaging said tubular members, said engaging means initially engaging all of said tubular members to move them conjointly and being movable radially of said first shaft and biased into engagement with said cam shaft to disengage said engaging means successively from said tubular members under control of said cam shaft, as said actuating means is moved toward said false rotor, beginning with the tubular member of smallest diameter.

2. In a coil inserting machine for inserting winding coils into stators of electrical machinery, the stators having peripheral slots extending longitudinally and radially thereof to receive the coils, in combination, a prewound false rotor having a spindle and slots equal in number and substantially corresponding in width to the stator slots, the pre-wound rotor having coils in said slots with heads projecting outside thereof, wedges associated with said coils for displacing the coils radially and arranged extending out of said slots at opposite ends thereof, means for holding the pre-wound rotor co-axial with the stator and with the stator slots disposed radially of the rotor slots in correspondence therewith, two fluid operated coil inserting heads arranged adjacent opposite ends of the stator for driving the wedges radially thereby to drive the coils arranged in the rotor slots radially into the stator slots, each of said heads comprising a first shaft movable longitudinally from a first position into co-axial engagement with the end of the rotor spindle adjacent to which the wedges extend out of the rotor slots, a plurality of tubular members slidably nested in one another and co-axial with said first shaft thereby coaxial with said rotor, the tubular members of graduated length with the innermost member longest and being frusto-conical at their ends next to the rotor and adapted to drive said wedges and associated coils radially, a cam shaft radially spaced from said first shaft and fixed thereto so as to be movable axially therewith and having a plurality of steps defining cam surfaces thereon, first fluid actuated means for selectively driving the first shaft into co-axial engagement with said rotor spindle end, second fluid actuated means guided on said first shaft and movable axially thereon selectively to move said tubular members axially toward said false rotor, said fluid actuated means including means selectively engaging said tubular members, said engaging means initially engaging all of said tubular members to move them conjointly and being movable radially of said first shaft and biased into engagement with said cam shaft to disengage said engaging means successively from said tubular members under control of said cam shaft, as said actuating means is moved toward said false rotor, beginning with the tubular member of smallest diameter, and means to deliver fluid under pressure for actuating said first and second fluid actuated means in a selected sequence.

3. A coil inserting machine according to claim 2, in which said cam shaft is rotatable and is provided with a substantially flat surface spaced angularly from said cam surfaces, and including third fluid-operated means for selectively rotating said cam shaft into a first angular position wherein said engaging means cooperates with said cam surfaces in successively disengaging the tubular members and for subsequently rotating it to a second operative position wherein said engaging means bears against said substantially flat surface thereby to permit said first shaft to be returned to its first position, and said first fluid actuated means being adapted to selectively return the first shaft to said first position.

4. A coil inserting machine according to claim 2, in which said tubular members are removable and replaceable with a different number of members and replaceable by members having a greater wall thickness, and in which means associated with the outermost tubular member in each head is constructed to engage the heads of the coils engaged in the stator and to bend them to a predetermined final configuration.

References Cited in the file of this patent
UNITED STATES PATENTS
2,506,173  Polard _____ May 2, 1950